United States Patent [19]

Honekamp et al.

[11] 4,080,250

[45] Mar. 21, 1978

[54] METHOD OF LOCATING A LEAKING FUEL ELEMENT IN A FAST BREEDER POWER REACTOR

[75] Inventors: John R. Honekamp, Downers Grove, Ill.; Richard M. Fryer, Idaho Falls, Id.

[73] Assignee: The United States of America as represented by the United States Department of Energy, Washington, D.C.

[21] Appl. No.: 417,652

[22] Filed: Nov. 20, 1973

[51] Int. Cl.² .............................................. G21C 17/04
[52] U.S. Cl. .................................. 176/19 LD; 176/37
[58] Field of Search ....................... 176/37, 80, 19 LD

[56] References Cited

U.S. PATENT DOCUMENTS

| | | | |
|---|---|---|---|
| 3,632,470 | 1/1972 | Rubin et al. | 176/19 LD |
| 3,663,363 | 5/1972 | Crouthamel et al. | 176/19 LD |
| 3,733,249 | 5/1973 | Miller et al. | 176/19 LD |
| 3,746,614 | 7/1973 | Meyer et al. | 176/19 LD |

OTHER PUBLICATIONS

Bettis Technical Review, vol. 1, No. 3, Aug., 1957, pp. 98–109, by Frank et al.
Nuclear Technology, vol. 21, Feb., 1974, *A Method for Detecting Fuel Cladding Penetration in LMFBRs....*, by Chellew et al., pp. 125–131, paper received Apr. 17, 1973.

*Primary Examiner*—Harvey E. Behrend
*Attorney, Agent, or Firm*—Dean E. Carlson; Arthur A. Churm; Frank H. Jackson

[57] ABSTRACT

Leaking fuel elements in a fast reactor are identified by measuring the ratio of $^{134}$Xe to $^{133}$Xe in the reactor cover gas following detection of a fuel element leak, this ratio being indicative of the power and burnup of the failed fuel element. This procedure can be used to identify leaking fuel elements in a power breeder reactor while continuing operation of the reactor since the ratio measured is that of the gases stored in the plenum of the failed fuel element. Thus, use of a cleanup system for the cover gas makes it possible to identify sequentially a multiplicity of leaking fuel elements without shutting the reactor down.

3 Claims, 1 Drawing Figure

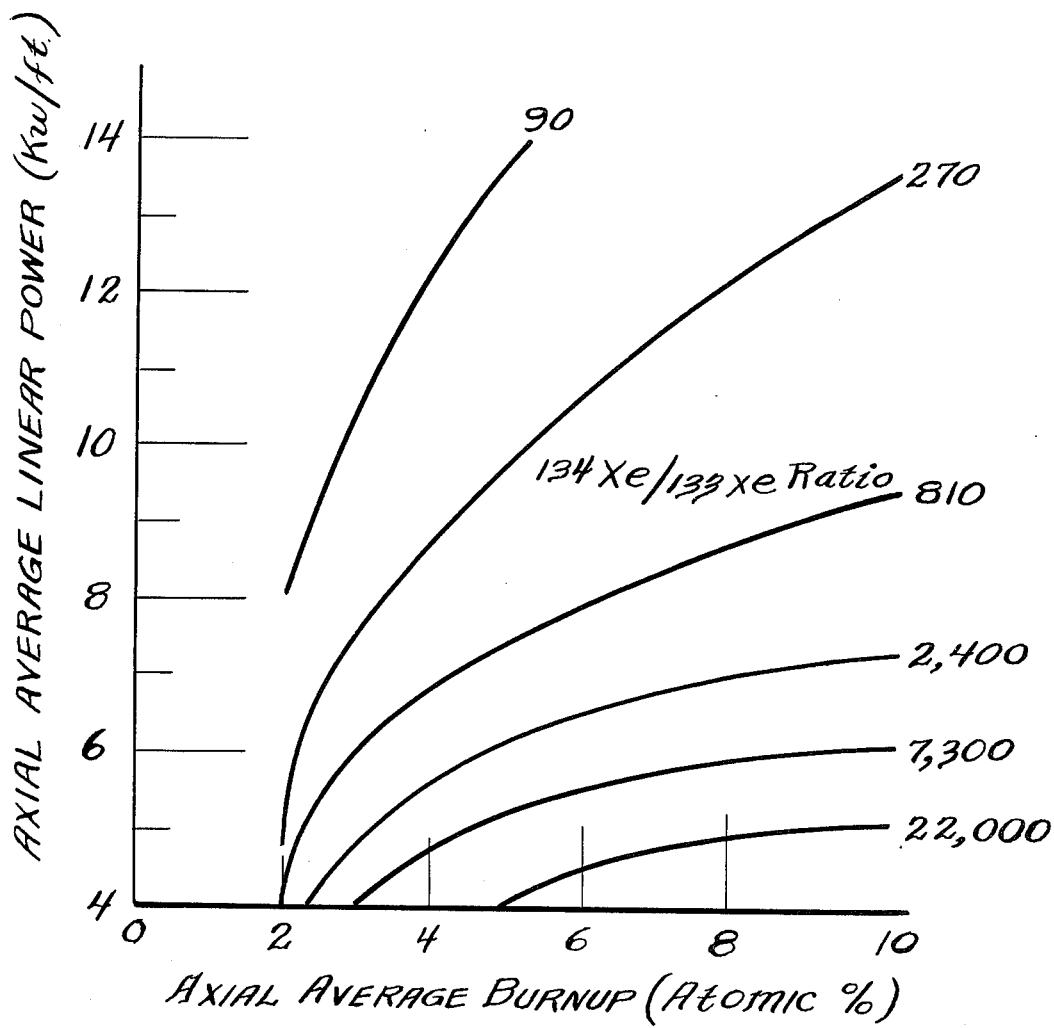

METHOD OF LOCATING A LEAKING FUEL ELEMENT IN A FAST BREEDER POWER REACTOR

CONTRACTUAL ORIGIN OF THE INVENTION

The invention described herein was made in the course of, or under, a contract with the U.S. ATOMIC ENERGY COMMISSION.

BACKGROUND OF THE INVENTION

This invention relates to the identification of failed fuel elements in a fast breeder reactor. The invention also relates to a method of operating a fast breeder reactor with failed fuel elements therein.

Conventionally, the gross radioactivity of a reactor coolant and/or the off-gases from the reactor are monitored during operation. An abrupt rise in radioactivity indicates that a cladding leak has occurred somewhere in the system. Experimental reactors are thereupon shut down and the offending element is removed from the system and replaced. Operation of power reactors is usually continued with the leaker present — frequently with a number of leakers present — either until a scheduled shutdown occurs or until the gross radioactivity of the coolant and off-gas becomes too high to tolerate. After shutdown all offending elements are removed and replaced.

In both cases identification of the failed fuel elements is necessary. Attempts have been made in the past to monitor the coolant exiting each subassembly in the reactor to determine directly the location of the failed fuel element. Unfortunately, success in this can only be attained with equipment which is extremely complex mechanically.

Identification is accomplished in most commercial light-water reactors by a technique known as "sipping". Following shutdown of the reactor the coolant in each subassembly is sampled and the sample is checked for certain radioactive fission products.

Tagging of subassemblies with a unique identifiable mixture of radioactive isotopes has also been suggested and tagging of fuel subassemblies placed in EBR-II (The Experimental Breeder Reactor #2) with mixtures of xenon isotopes having a mass number of less than 131 is now being accomplished on a routine basis. Such a procedure, unfortunately, is very expensive and it is estimated that it will cost $400,000 to xenon tag the fuel subassemblies for the Fast Test Reactor included in the Fast Flux Test Facility now under construction at Richland, Wash. In addition, xenon tagging is not wholly satisfactory since the tag ratios change with irradiation. A particular problem in EBR-II is that the older experimental subassemblies in that reactor are not xenon tagged and it is these subassemblies that are most likely to leak. Thus, there is a continuing need for new procedures for identifying failed fuel elements and the need is expected to increase tremendously in the future as fast breeder power reactors are put on the line.

SUMMARY OF THE INVENTION

We have determined that the isotopic ratio of fission product $^{134}$Xe to $^{133}$Xe present in a liquid-metal-cooled fast-breeder-reactor fuel element identifies the fuel element in terms of its power and burnup. Thus, according to the present invention, when a monitor indicates the presence of radioactive fission product gases in the reactor cover gas, a sample is taken and analyzed by a mass spectrometer to determine the ratio of $^{134}$Xe to $^{133}$Xe present therein. Since these isotopes can only come from a failed fuel element, the measured ratio can be compared with the ratio of those isotopes present in fuel elements operated at known power levels to known burnups. There will be only one or a few fuel elements which have the indicated power history. Other information such as the statistical probability that a fuel assembly may contain a leaking fuel element and the presence or absence of a xenon tag can also be used to narrow down the number of possibilities. If a number of possibilities still exist, trial and error removal of subassemblies from the reactor must be employed to specifically identify the assembly containing the leaking element.

Another aspect of the present invention involves use of the above technique to identify failed fuel elements while the reactor is operating. Operation of the reactor is continued after identification is accomplished and the cover gas is cleaned to remove the $^{134}$Xe and $^{133}$Xe therefrom making it possible to identify other leaking elements while continuing operation of the reactor. The leaking elements are removed during a scheduled shutdown.

BRIEF DESCRIPTION OF THE DRAWING

The single FIGURE is a graph which gives $^{134}$Xe/$^{133}$Xe ratios plotted as a function of power and burnup for a fuel loading of 5 grams per inch of a mixed oxide fuel containing approximately 75% UO$_2$ and 25% PuO$_2$.

DETAILED DESCRIPTION OF THE INVENTION

The general procedure employed to practice the present invention is to generate a body of reference data for the particular type of fuel employed in the reactor and compare a reading obtained when a leaking fuel element is detected with this reference data to identify the leaking element. Separate reference data must be obtained for each type of fuel. That is, the reference data will be different for fuel that is chemically different or for fuel elements having substantially different parameters. However, minor differences in composition, size or shape of the fuel element will not change the data appreciably.

The reference data required is data showing how the ratio of fission product isotopes $^{134}$Xe and $^{133}$Xe varies as a function of power and burnup of the fuel and the manner in which this reference data is generated will next be described.

Since the value for $N_{134}$ — the total number of atoms of a stable fission gas isotope in the plenum of a fuel pin — is given in formula 1) as $$N_{134} = 6.02 \times 10^{23} \cdot W/MW \cdot A/100 \cdot F/100 \cdot Y_{134} \quad (1)$$

where
  $6.02 \times 10^{23}$ = atoms/gram mol
  W = Weight of fuel in grams
  MW = Molecular weight (grams/mol)
  A = Burnup (atom percent)
  F = Stable gas release (percent)
  $Y_{134}$ = Fractional fission yield for $^{134}$Xe and the value for $N_{133}$ — the total number of atoms of a radioactive fission gas isotope in the plenum of a fuel pin — is given in formula 2) as $$N_{133} = 3.125 \times 10^{13} \text{ P.L.} \cdot Y_{133} \cdot R/B_{133} \cdot X/\lambda_{133} \quad (2)$$

where $3.125 \times 10^{13}$ = Fissions/kilowatt second
P = Average linear power (kw/ft)
L = Fuel length (feet)
$Y_{133}$ = Fractional fission yield for $^{133}$Xe
$R/B_{133}$ = Release/birth ratio for $^{133}$Xe
X = Fraction of radioactive equilibrium for $^{133}$Xe
then the ratio of $^{134}$Xe/$^{133}$Xe may be obtained by dividing equation 1) by equation 2) and combining constants to give $$3)\ N_{134}/N_{133} = 35.04\ (G.A/MW.P)\ (F/R/B_{133})\ (Y_{134}/Y_{133})\ (1/X) \quad (3)$$

where
35.04 is a units conversion constant and
G = Grams per inch of fuel

In equation (3) G, A and P are design parameters, $Y_{134}$ and $Y_{133}$ are known constants and X is a power history correction. While F is known and can be obtained from the open literature, $R/B_{133}$ — the ratio of $^{133}$Xe released to the fuel pin plenum to the $^{133}$Xe born in the fuel — is not available and must be determined by experiment. As defined above $R/B_{133}$ is an "effective" value since it includes any decay of the $^{133}$Xe during migration of the fission gas from the fuel region to the plenum region.

To obtain $R/B_{133}$ by experiment unfailed fuel elements which have been operated to different burnups at different powers are gamma scanned at one specified plenum location for $^{133}$Xe activity. With prior calibration and knowing the plenum geometry, the gamma-scan data can be used to calculate the total number of curies of $^{133}$Xe in the fuel element plenum at the time of reactor shutdown. The $^{133}$Xe production rate can be calculated from the fuel element design and operating parameters. These two pieces of information yield the release-to-birth ratio — $R/B_{133}$ for $^{133}$Xe for that fuel element at one time in its life. This ratio is then employed in equation 3 in the computation of $N_{134}/N_{133}$.

Specifically, the gamma-scan data is used to calculate $N_{133}$ by using formula 4

$$N_{133} = C_n/\lambda \cdot K \cdot \gamma^{-1} \cdot V/V_c \cdot e^{\lambda t} \quad (4)$$

where
$C_n$ = Net count rate
$\gamma$ = Attenuation factor for the fuel element cladding
V = Plenum volume
$V_c$ = Counting volume
K = Calibration constant
$\lambda$ = Decay constant for $^{133}$Xe
t = Time interval between reactor shutdown and measurement To obtain the release-to-birth ratio equation 2) is solved for $R/B_{133}$ $$R/B_{133} = 3.2 \times 10^{-14} \cdot N_{133} \cdot \lambda_{133}/P.L.\ Y_{133} \cdot \gamma \quad (5)$$

The significance of symbols is as given above. Thus, we have the release-to-birth ratio for $^{133}$Xe in fuel elements which have been operated to different power levels and burnups. These figures are substituted in formula 3 and — all the other parameters being known — the $^{134}$Xe/$^{133}$Xe ratio is computed for a number of different power levels at different burnups. This is the reference data required. It is not to be presumed that the foregoing procedure is the only one that could be used to generate the required reference data. However, this procedure has been used successfully. The following discussion shows how this invention has been used to identify leaking fuel elements in EBR-II — The Experimental Breeder Reactor No. 2. The elements of concern are experimental elements consisting of unencapsulated stainless steel clad (U,Pu)O$_2$ rods in subassemblies containing from 19 to 61 fuel elements. A brief review of those aspects of the design and operation of EBR-II which are pertinent to the present invention are contained in Proceedings of American Nuclear Society Topical Meeting on Irradiation Experimentation in Fast Reactors, Jackson, Wyo.; September 10–13, 1973. "The Effects of Defected Fuel Elements on the Operation of EBR-II", J. R. Honekamp et al., pages 435 to 455.

When a fuel element is removed from EBR-II for an interim examination, it is gamma scanned at one specified plenum location for $^{133}$Xe activity. $N_{133}$ is then calculated from the gamma-scan data for each element examined using equation 4 and equation 5 is then used to calculate $R/B_{133}$ as a function of power and burnup. Having obtained $R/B_{133}$ the ratio $N_{134}/N_{133}$ is calculated from equation 3 since all the elements on the right side of the equation are known. The results of these calculations are plotted in the FIGURE. These results are for mixed oxide fuel containing approximately 75% UO$_2$ and 25% PuO$_2$ and a fuel loading of 5 grams per inch.

The FIGURE thus provides reference information with which an indication obtained at the time of a fission gas release can be compared to identify the source of the fission gas. So long as the fuel in the EBR-II is not changed substantially this graph can be used.

Following detection of a fission gas release, a sample of the cover gas is taken and an aliquot of this sample analyzed for $^{134}$Xe and $^{133}$Xe with a mass spectrometer and the ratio of $^{134}$Xe to $^{133}$Xe determined. An on-line mass spectrometer can be used if available. The graph is then used to indicate possible power-burnup combinations by proceeding along the line for the specific ratio determined. Reference to the operating history of the fuel elements will then indicate that one or only a few fuel elements will have been operated at a burnup and to a power level such that the indicated $^{134}$Xe/$^{133}$Xe ratio is possible.

In spite of the fact that the graph is based on only a very limited amount of data, this technique can be and has been used successfully in identifying leaking fuel elements.

The following examples show how this technique could have predicted the actual leaker in fission gas releases occurring in the past in EBR-II.

SUBASSEMBLY NO. X085

The $^{134}$Xe/$^{133}$Xe ratio measured in the cover gas, corrected to radioactive equilibrium was 11.5. Assuming that the uncertainty in the prediction from equation 3 is a factor of 2, pins which have a predicted $^{134}$Xe/$^{133}$Xe ratio between ~5 and 25 would be suspect. From FIG. 1, it is apparent that the most likely suspects are low burnup pins operating at medium to high power levels. The calculations in FIG. 1 were stopped at 2 at. % because at lower burnups the R/B changes rapidly with burnup. Based on the core loading at that time, the subassemblies that would meet this criterion are listed below:

X085 — Xe tagged, intentional defect test
X087 — Xe tagged, PNL-9
X093 — Xe tagged, PNL-10
X094 — Encapsulated GGA high temperature test
X112 — Xe tagged, ORNL unencapsulated test
X115 — Xe tagged, WARD grid test The one encapsulated test, X094, is a less likely suspect because the capsule could hold up the fission gas thus increasing the $^{134}XE/^{133}Xe$ ratio.

The actual leaker, X085, was identified by its Xe tag. However, the $^{134}Xe/^{133}Xe$ ratio in this case reduced the suspect list of mixed oxide tests from 23 to 6 subassemblies.

XX04

This subassembly did not leak. However, fission gas was observed in the terminal box and the $^{134}Xe/^{133}Xe$ ratio was measured. The corrected ratio in this case was 10.5. Again the $^{134}Xe/^{133}Xe$ ratio correctly describes the source of this fission gas a a low burnup, medium to high power pin.

X106

The $^{134}Xe/^{133}Xe$ ratios measured in this case were ~400 when corrected to equilibrium. Suspect subassemblies are listed below:

X081 — GE encapsulated pins at ~10 at. %
X088 — WARD encapsulated pins at ~3 at. %
X113 — ANL encapsulated pins at ~11 at. %
X058 — GE tagged unencapsulated pins at ~7 at. %
X043 — GE untagged unencapsulated pins at ~7 at. %
X062 — GE untagged unencapsulated pins at ~7 at. %
X084 — ANL untagged unencapsulated RTF test ~12 at. %
X106 — ANL untagged unencapsulated RTF test ~7 at. %
X114 — HEDL untagged unencapsulated RTF test ~6 at. %
X116 — HEDL untagged unencapsulated RTF test ~6 at. %

In this example the $^{134}Xe/^{133}Xe$ ratio reduced the suspect list from 24 mixed oxide test to 10. If the three encapsulated tests and one tagged test are considered lower order suspects the list is reduced to six which contains the actual leaker X106.

X073

The $^{134}Xe/^{133}Xe$ ratio in the cover gas corrected to equilibrium was ~1800. However, in this case the total amount of $^{133}Xe$ released to the cover gas was so small that the uncertainty in the reported ratio could be more than a factor of 2. FIG. 8 immediately suggests a low power pin as the only source of a $^{134}Xe/^{133}Xe$ ratio of 1800. The only suspect subassemblies are:

X117 — GE encapsulated test
X118 — GE encapsulated test
X073 — HEDL tagged unencapsulated test This is a reduction from 13 mixed oxide experiments to 3. X073 was identified as the leaker by tag gas analysis. However, because of the small gas release, the measured tag ratios were first interpreted as belonging to X058. In this case the added information from the $^{134}Xe/^{133}Xe$ ratio clearly rules out X058 as a suspect.

From the previous discussions it is evident that even with very crude $(R/B)_{133}$ data, the $^{134}Xe/^{133}Xe$ ratio can be of help in leaker identification.

The following example shows how this technique was used in determining the actual leaker in a fission gas release occurring in EBR-II. On Sept. 25, 1972, a large increase in cover-gas activity was noted and the reactor was shut down. Analysis of a cover-gas sample showed no xenon tag and an intensive comparative analysis of the release data was made. Key information of the analysis included: a failure-probability prediction of 0.95 for driver experiment X083A; a relatively large activity release containing significant fractions of short-lived gas isotopes and no xenon-tag isotopes; and a measured $^{134}Xe/^{133}Xe$ ratio, corrected to $^{133}Xe$ at saturation of 90. The ratio of 90 is relatively low — it does not correspond in general with high-burnup or low-heat-rating oxides. The relative richness of short-lived isotopes observed strongly implied lack of encapsulation. Based on this conclusion and the lack of a xenon tag, all encapsulated and xenon-tagged experiments except X084 (test element not tagged) and X073 (tag possibly lost by prior leakage) were temporarily eliminated as suspects. Experiments X084 and X073 were, in turn, eliminated by the measured ratio, which was much smaller than the predicted ratios for X084 and X073.

The remaining suspect list included: five Mark-II drivers at a burnup of ~6 at. %; subassembly X083A; and six subassemblies containing unencapsulated mixed oxides (X051A, X059A, X114, X116A, X143, and X144). The five Mark-II drivers were temporarily exonerated on the basis of the measured ratio. (Two of the Mark-II drivers, however, did contain a few elements that might have exhibited a ratio of 90. ) The estimated ratio band for X083A was 90–250, and the quantity of the fission-gas release was nearly identical to that observed for companion experiment X082A, which leaked at the same burnup. Thus, X083A, with 53 high-burnup elements, was clearly marked as having a very high index of suspicion. Of the oxides, X051A and X059A each contained only four elements whose estimated ratio corresponded with the measured value, and X143 and X144 contained only two elements whose ratio corresponded with the measured value. Experiment X114 did not contain any elements having the proper estimated ratio. All 19 elements in X116A, however, had ratio bands that spanned the measured value. Thus, of the basic suspect seven experiments, X083A and X116A contained 72 of the most suspect 84 fuel elements.

As a result of this analysis, X083A and X116A were removed from the core, and the reactor was returned to power. Operation of the reactor for approximately four days at full power has confirmed that the leaker is no longer in the core. X116A was subsequently returned to the core with no activity confirming X083A as the leaker.

The specific isotopic ratio measured in accordance with this procedure is uniquely suitable for the purpose as is illustrated by the following considerations. The quantity of $^{133}Xe$ released (a radioactive isotope with a 5.3 day half life) is a strong function of the fuel element power and a weak function of burnup. The quantity of $^{134}Xe$ released (a stable isotope) is a strong function of burnup and a weak function of power. Thus, the ratio of these two isotopes provides a sensitive indicator of the power and burnup of the fuel element. Both isotopes have a large fission yield (~6%) which makes them relatively easy to measure. The half life of $^{133}Xe$ is long enough to make the measurement of R/B by gamma scanning relatively easy. It may be possible by improving the gamma scanning technique to utilize $^{135}Xe$ in place of $^{133}Xe$, however, the longer half life of $^{133}Xe$ is an advantage if the proposed technique is used in a reactor which employs a cover gas purification system as will be discussed. It is also possible to obtain R/B data for a number of radioactive isotopes from special experiment and actual fuel element leaks rather than γ scanning non-failed elements. If this approach is used, a series of ratios of a radioactive isotope to a stable isotope (e.g. $^{134}$Xe) could be developed. The proposed technique would then be used to correlate these data in a manner amenable to prediction of these ratios for the purpose of identifying the failed fuel element. In the case of an experimental reactor such as EBR-II where examination facilities exist, γ scanning non-failed element is the most efficient approach. The data generated at EBR-II on a given type of fuel are expected to be applicable to other fast reactors. For the case where appropriate experimental facilities are not available to perform the gamma-scan measurements, correlation of operational data by the proposed technique may be the most practical approach. The basic technique, identification of a failed element by the ratio of a stable fission gas isotope to a radioactive fission gas isotope, is the same regardless of the source of the release fraction data.

APPLICATION OF THE TECHNIQUE

The technique is currently applied at EBR-II as follows. When radioactive fission gases are detected in the argon cover gas above the primary sodium, a sample of the xenon isotopes in the argon is obtained by adsorption on activated charcoal at cryogenic temperatures. This sample is further concentrated in the laboratory and then analyzed for the xenon isotopic distribution with a gas mass spectrometer. From this analysis the $^{134}$Xe/$^{133}$Xe ratio is obtained. This measured ratio is then corrected to full power equilibrium conditions and compared to the predicted $^{134}$Xe/$^{133}$Xe ratio for each subassembly in the reactor.

To enhance the capability of EBR-II to conduct defected fuel tests a cover gas purification system is being designed. This system will continuously circulate the argon cover gas through a cryogenic distillation column where the gaseous fission products will be removed. The clean argon is then returned to the reactor. It is planned to incorporate an on-line gas mass spectrometer in this system to continuously monitor the isotopic distribution of the fission gases in the argon leaving the reactor. The rate of removal of xenon from the argon cover gas by the purification system proposed for EBR-II corresponds to a 20 minute half life. The main effect of the purification system is to reduce the gaseous fission product activity from fuel elements which have previously failed but have not been removed from the reactor. This is most effective for long lived isotopes (e.g. $^{133}$Xe is reduced by a factor of 380 while $^{138}$Xe with a 17 minute half life is reduced by a factor of 2). When a new element fails, there will still be a transient in the fission product activities in the cover gas. The largest increase will be in the long lived isotopes (e.g. $^{133}$Xe) since they have higher release fractions and can be stored longer in the fuel element gas plenum. Thus, in a reactor utilizing a cover gas purification system, the long lived radioactive isotopes and the stable isotopes will provide the most sensitive indication of a new failure in the presence of previous failures. The use of the $^{134}$Xe/$^{133}$Xe ratio in this situation represents an optimum choice. Since cover gas purification will be installed on the LMFBR for environmental reasons, the incorporation of an on-line gas mass spectrometer to monitor the $^{134}$Xe/$^{133}$Xe ratio is a natural extension. If other location techniques such as xenon tagging or individual subassembly sampling during a reactor shutdown are employed, the $^{134}$Xe/$^{133}$Xe ratio can still be of value. For example, if xenon tagging is employed a system to recover the xenon tags must be installed. This same system would also yield the $^{134}$Xe/$^{133}$Xe ratio with no additional effort. The $^{134}$Xe/$^{133}$Xe information can be used to reduce the number of different tags required thus reducing the cost of tagging. It could also be employed as a backup to xenon tagging. If individual subassembly sampling during a reactor shutdown (sipping) is used (the current practice in LWR's), the $^{134}$Xe/$^{133}$Xe information can reduce the number of subassemblies to be sampled and thus reduce the reactor downtime associated with location of defected elements.

The embodiments of the invention in which an exclusive property or privilege is claimed are defined as follows:

1. A method of locating a leaking fuel element in a liquid-metal-cooled fast breeder power reactor comprising monitoring the reactor cover gas for radioactive fission products, sampling the cover gas when the monitor indicates the presence of radioactive fission products, measuring the ratio of the natural fission gas isotopes $^{134}$Xe to $^{133}$Xe in the cover gas, said ratio being indicative of the power and burnup of the failed fuel element and comparing said ratio with previously determined data obtained from fuel elements which have been operated to different power levels and burnups.

2. A method of operating a liquid-metal-cooled fast breeder power reactor comprising monitoring the reactor cover gas for radioactive fission products, sampling the cover gas when the monitor indicates the presence of radioactive fission products in the cover gas, measuring the ratio of the natural fission gas isotopes stable $^{134}$Xe to radioactive $^{133}$Xe in the cover gas, comparing said ratio with previously determined values of said ratio of natural fission gas isotopes present in fuel elements operated at known power levels to known burnups, identifying one or several fuel elements having the proper burnup and power level to provide the indicated ratio, purifying the cover gas continually to remove radioactive fission products therefrom, continuing operation of the reactor until the monitor again indicates the presence of radioactive fission products in the cover gas, repeating the above-described procedure for identifying the leaking fuel element, continuing said procedure until a scheduled shutdown or until the number of leaking fuel elements increases to the point the reactor can no longer be operated, shutting down the reactor, removing and replacing all the previously identified leaking fuel elements and restarting the reactor.

3. A method of operating a liquid-metal-cooled fast breeder power reactor comprising monitoring the reactor cover gas for radioactive fission products, identifying the fission products present in the cover gas, from the identity and proportion of fission products present in the cover gas determining which fuel element has failed, purifying the cover gas continually to remove radioactive fission products therefrom, continuing operation of the reactor until the monitor again indicates that presence of radioactive fission gases in the cover gas, repeating the above-described procedure for identifying the leaking fuel element, continuing said procedure until a scheduled shutdown or until the number of leaking fuel elements has increased to the point where operation can no longer be safely continued, shutting down the reactor and removing and replacing the previously identified failed fuel elements.

* * * * *